United States Patent
Lee et al.

(10) Patent No.: US 9,900,572 B2
(45) Date of Patent: Feb. 20, 2018

(54) CAMERA SYSTEM OF MOBILE DEVICE FOR CAPTURING IMAGES, AND METHOD ADAPTED THERETO

(71) Applicant: Samsung Electronics Co., Ltd., Gyeonggi-do (KR)

(72) Inventors: Sangchul Lee, Gyeonggi-do (KR); Jeongmo Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 91 days.

(21) Appl. No.: 13/893,818

(22) Filed: May 14, 2013

(65) Prior Publication Data

US 2013/0302007 A1   Nov. 14, 2013

(30) Foreign Application Priority Data

May 14, 2012   (KR) .................. 10-2012-0050987

(51) Int. Cl.
| | | |
|---|---|---|
| H04N 5/77 | (2006.01) | |
| H04N 9/79 | (2006.01) | |
| H04N 3/00 | (2006.01) | |
| H04N 5/232 | (2006.01) | |

(52) U.S. Cl.
CPC .............. *H04N 9/79* (2013.01); *H04N 3/00* (2013.01); *H04N 5/23245* (2013.01); *H04N 5/23258* (2013.01); *H04N 5/23293* (2013.01)

(58) Field of Classification Search
CPC .. H04N 3/00; H04N 5/23245; H04N 5/23258; H04N 5/23293
USPC .................. 386/224, 227, 223, 242
See application file for complete search history.

(56) References Cited

U.S. PATENT DOCUMENTS

| | | | |
|---|---|---|---|
| 9,268,362 B2* | 2/2016 | Chen ................... G06F 1/1626 |
| 9,355,015 B2* | 5/2016 | Wray ................ G06F 11/3672 |
| 2005/0062876 A1* | 3/2005 | Okutani ............. H04N 5/2252 348/371 |
| 2005/0168583 A1* | 8/2005 | Thomason ................ 348/208.4 |
| 2006/0126120 A1* | 6/2006 | Imafuku ........... H04N 1/00132 358/1.18 |
| 2006/0126177 A1* | 6/2006 | Kim et al. ..................... 359/465 |
| 2007/0258658 A1* | 11/2007 | Kobayashi ............. G06T 15/20 382/276 |
| 2008/0043283 A1* | 2/2008 | Takeda ............... H04N 1/00204 358/1.15 |
| 2009/0244602 A1* | 10/2009 | Suse .................. G03G 15/5087 358/1.15 |
| 2011/0211092 A1* | 9/2011 | Sakaue ............. H04N 5/23293 348/231.3 |
| 2011/0228112 A1 | 9/2011 | Kaheel et al. |
| 2011/0298940 A1 | 12/2011 | Cheong et al. |
| 2012/0230429 A1* | 9/2012 | Boyce ................... H04N 19/46 375/240.25 |
| 2012/0320250 A1* | 12/2012 | Kitamori et al. ........ 348/333.06 |

(Continued)

FOREIGN PATENT DOCUMENTS

CN   101232329   7/2008

*Primary Examiner* — Helen Shibru
(74) *Attorney, Agent, or Firm* — The Farrell Law Firm, P.C.

(57) ABSTRACT

A method for recording moving images via a camera system includes detecting a rotation state of a device and setting an image rotation angle in image record mode, rotating images acquired via a camera module by the set image rotation angle, and encoding and storing the rotated images.

12 Claims, 10 Drawing Sheets

(56) References Cited

U.S. PATENT DOCUMENTS

2014/0040959 A1\* 2/2014 Oyman .............. H04N 21/6131
725/62

\* cited by examiner

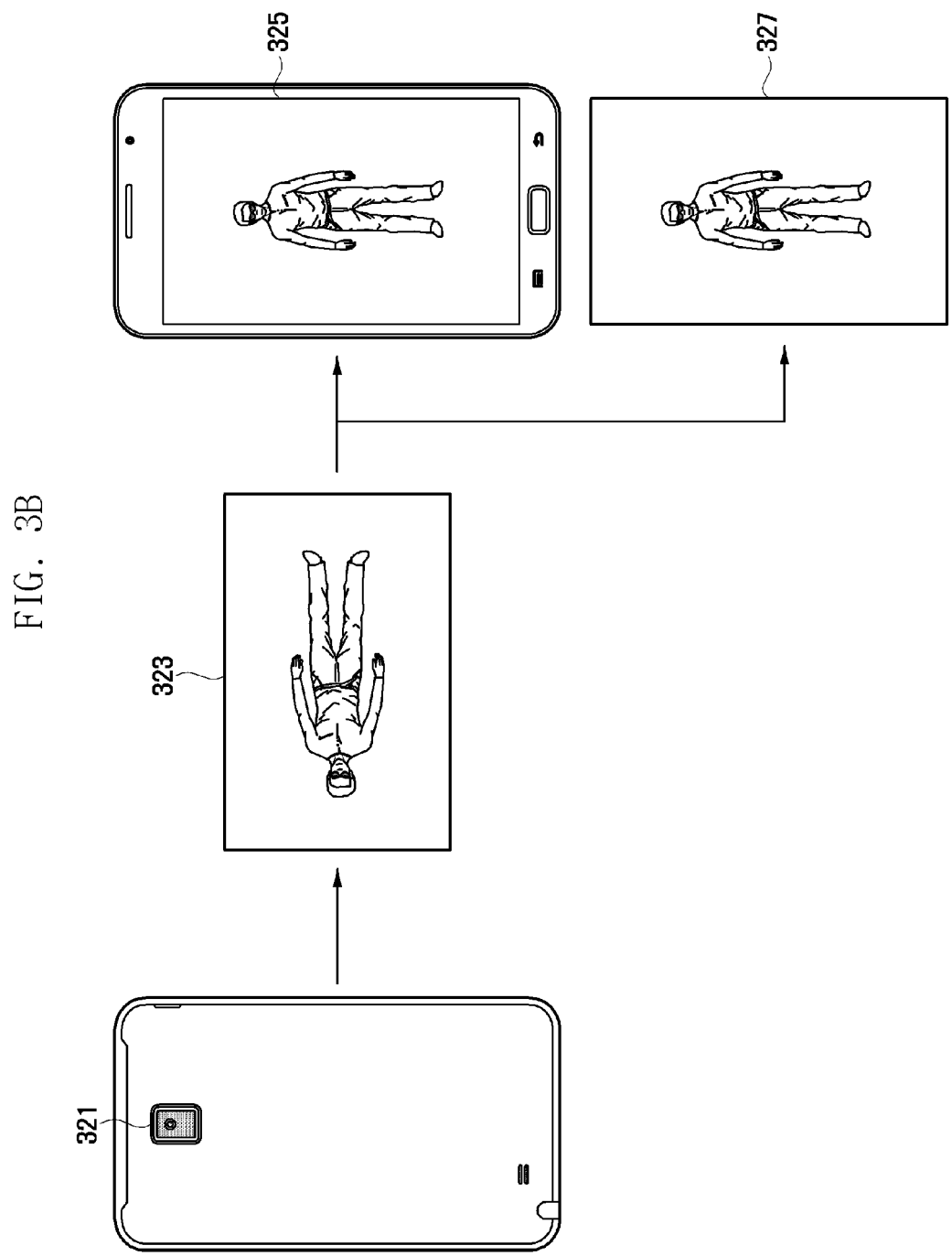

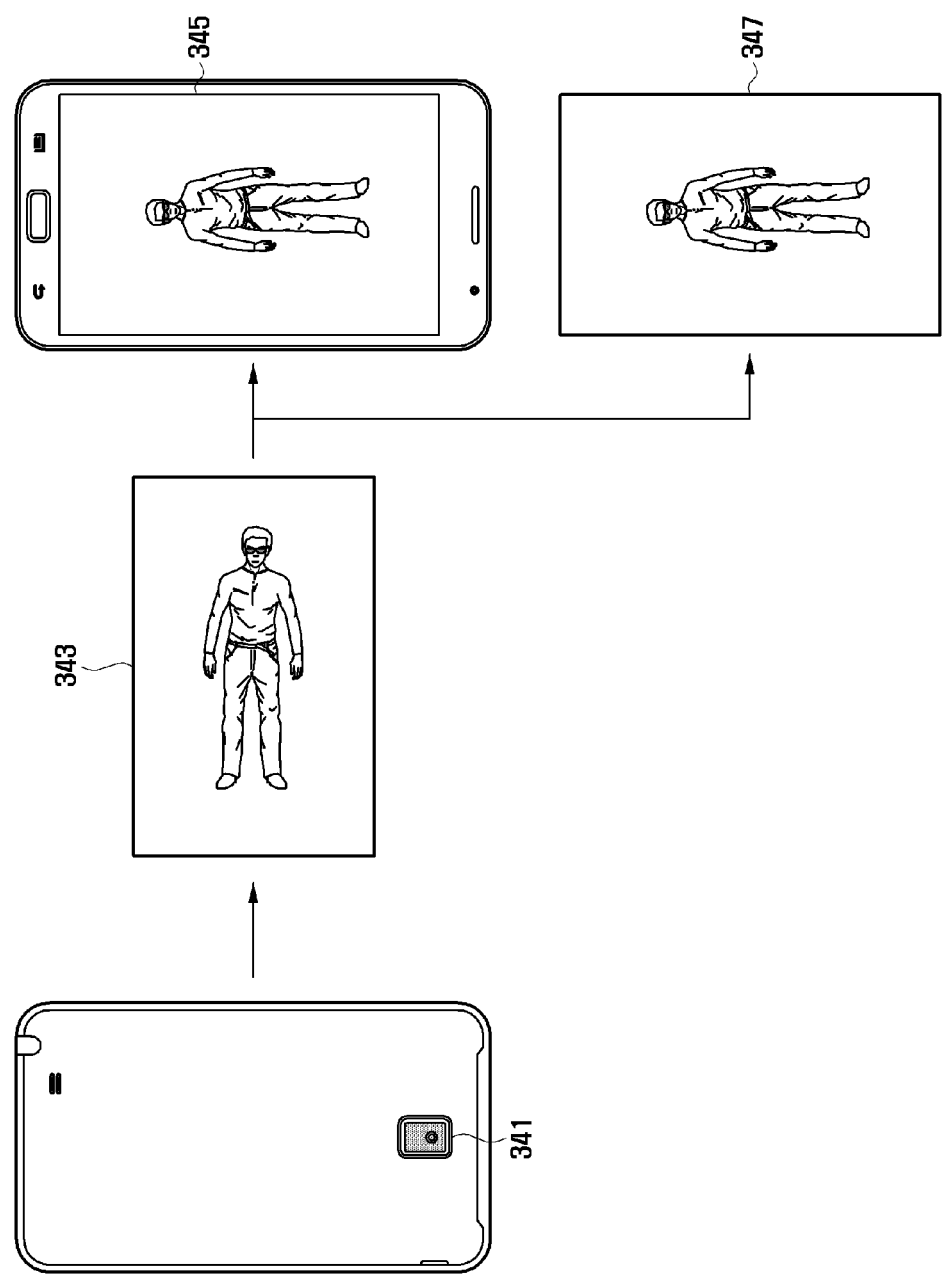

CAMERA SYSTEM OF MOBILE DEVICE FOR CAPTURING IMAGES, AND METHOD ADAPTED THERETO

PRIORITY

This application claims priority under 35 U.S.C. § 119(a) to a Korean patent application filed on May 14, 2012 in the Korean Intellectual Property Office and assigned Serial No. 10-2012-0050987, the contents of which are incorporated herein by reference.

BACKGROUND OF THE INVENTION

1. Field of the Invention

The present invention relates generally to a system, installed to a mobile device with a camera module, for capturing moving images, and a method adapted thereto.

2. Description of the Related Art

In general, mobile devices with cameras or camera systems capture moving images and store them in a landscape mode irrespective of their positions when capturing them. The captured moving images are stored in such a manner that the width resolution is larger than the height resolution, such as 640×480. Therefore, although mobile devices with cameras or camera systems are positioned in a vertical position and capture moving images, the captured moving images are stored in such a manner that the width resolution is larger than the height resolution. If mobile devices with cameras or camera systems capture still images in the vertical position, the rotation information regarding the captured still images is stored with the metadata.

Images can be played back in the same mode when they are recorded in a landscape mode. Alternatively, recorded images may be played back, based on the rotation information from the metadata. Since the former method plays back the recorded moving images only in the landscape mode irrespective of the recording directions of mobile devices with cameras or camera systems, the direction of images is inconsistent. Since the latter method rotates and plays back recorded images according to the rotation information regarding the recorded images, the images are incorrectly played back via other display devices such as computers. That is, if other display devices do not acquire the rotation information regarding the recorded images, by parsing the information from the metadata, the images may be incorrectly played back. For example, the display devices may display the recorded images in an upside down direction or in a vertically rotated direction.

SUMMARY OF THE INVENTION

The present invention has been made in view of the above problems, and provides a system and method that detects, when mobile devices with cameras or camera systems such as mobile phones capture moving images, the rotation of the mobile devices, and rotates and stores the captured moving images according to the detected rotation direction, such that the images are displayed in the correct mode during the playback.

In accordance with an embodiment of the invention, a method is provided for recording moving images via a camera system, including detecting a rotation state of a device and setting an image rotation angle in image record mode, rotating images acquired via a camera module by the set image rotation angle, and encoding and storing the rotated images.

In accordance with another embodiment of the invention, a system is provided for recording moving images, including a camera module with an image sensor, a rotation detector which detects a rotation state of a device, a video processor which detects a rotation state of the device to set an image rotation angle in image record mode, rotating images acquired via the camera module by the set image rotation angle, and encoding them as moving images, a storage unit which stores the encoded moving images, and a display unit which displays the images output from the video processor.

BRIEF DESCRIPTION OF THE DRAWINGS

The features and advantages of the invention will become more apparent from the following detailed description viewed in conjunction with the accompanying drawings, in which:

FIGS. 3A to 3D illustrate screens describing a method which stores an image in a mobile device with a camera or camera system, according to the rotation states of the mobile device, according to an embodiment of the invention;

DETAILED DESCRIPTION OF EMBODIMENTS OF THE INVENTION

Figure 1:
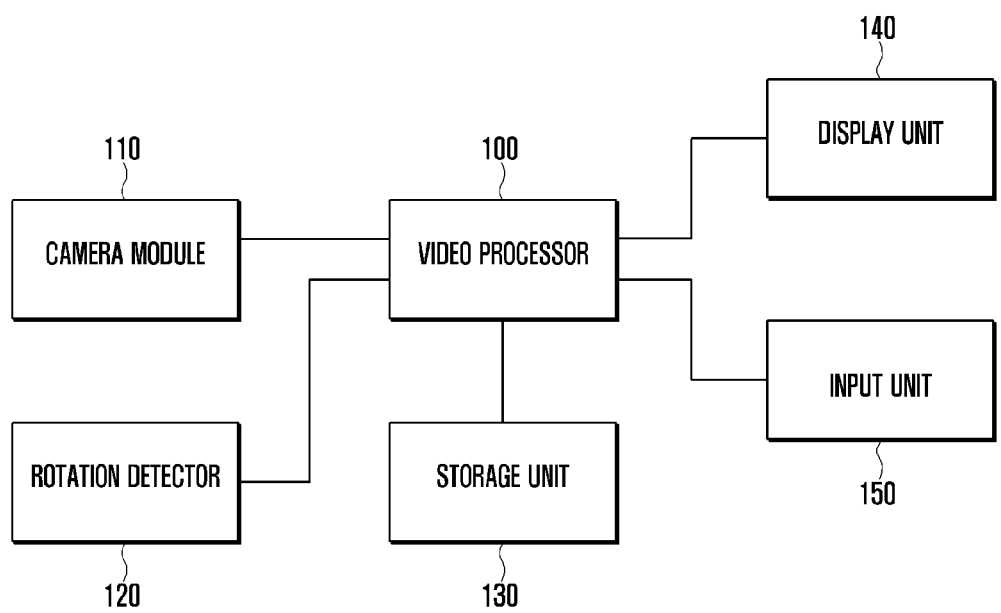
FIG. 1 illustrates a block diagram of a camera system according to an embodiment of the invention.

Hereinafter, embodiments of the invention are described in detail with reference to the accompanying drawings. The same reference numbers are used throughout the drawings to refer to the same or similar parts. In the following description of the present invention, a detailed description of known functions and configurations incorporated herein will be omitted for the sake of clarity and conciseness.

An image sensor of a camera module has a width and a length that differ from each other. Therefore, if the camera module, installed to a mobile device, captures a picture when the device is rotated, the captured picture may be a landscape image or a portrait image. However, the mobile device with a camera or camera system stores the images, acquired via the image sensor of the camera module, as landscape images. The stored landscape images are played back in a rotated state. The invention provides a method that stores moving images corresponding to the states in which the mobile device with a camera or camera system (e.g., mobile phones, tablet Personal Computer (PC) and Motion Pictures Experts Group (MPEG) Layer Audio 3 (MP3) devices) captured the moving images. Although the embodiments will be explained based on a mobile device with a camera system, it should be understood that the invention can be applied to a mobile device with a camera.

The term 'normal phase' refers to displaying images, acquired via a camera image sensor installed to a mobile device, in a normal state when rotating and playing back the acquired images, considering the rotation state of the mobile device.

If a user executes an instruction for capturing moving images in a mobile device with a camera or camera system, the mobile device detects the rotation state and rotates the captured moving images according to the detected rotation state. That is, if the mobile device ascertains that the moving images are captured in a vertical position or a reverse position, it sets to alter the resolution of capturing images and/or to rotate the frame images.

For example, although a mobile device with a camera or a camera system captures images in a vertical position, it can store the captured images as landscape images (i.e., images having a larger value in the landscape direction than in the portrait direction). The alteration of the captured image resolution indicates to alter the resolution from an image with a larger value in the landscape direction than in the portrait direction to an image with a larger value in the portrait direction than in the landscape direction.

Since the images captured in a vertical position of a mobile device may be displayed in a rotated state on the display, the captured image resolution is altered to set the rotation of the display in order to prevent the images from being displayed on the display screen in an incorrect direction, so that the user can always watch the images on the display screen in the correct direction. The mobile device performs an image-recording operation with the altered resolution and the rotation setting of frame images. If the mobile device is set with the altered settings after recording images and storing the data, it restores the settings to the values before the recording operation.

When a mobile device with a camera or a camera system records moving images for a subject in a vertical position (portrait mode), it can store video frames with a larger width resolution than height resolution (resolution of landscape mode) if the rotation of frame images is not set. The system and method according to the invention can detect the rotation state of a mobile device, and rotate and store frame images according to the detected, rotated state. Therefore, although the mobile device performs an image capturing operation in a vertical position, the system and method according to the invention can process the frame images in such a manner that the height resolution is greater than the width resolution, and then store the frame images.

FIG. 1 illustrates a block diagram of a camera system according to an embodiment of the invention. The camera system includes a camera module 110, a rotation detector 120, a video processor 100, a display unit 140, a storage unit 130, and an input unit 150.

Referring to FIG. 1, the camera module 110 includes an optic component (not shown), an image sensor (not shown), and a signal processor (not shown). The camera module 110 acquires images via the image sensor. The optic component is driven via a motor and an actuator. The optic component performs a zooming operation and a focusing operation via the actuator. The optic component is used to capture images of a subject. The image sensor senses the light of images through the optic component and converts it to the electrical signals. The image sensor may be implemented with high-resolution sensors, such as a Complementary Metal Oxide Semiconductor (CMOS) a Charge Coupled Device (CCD) sensor, or may be for sensing images of Ultra High Definition (UHD). The images sensed via the image sensor are converted to digital images via the signal processor. The output data from the camera module 110 may be Bayer data (raw data).

The rotation detector 120 includes one or more sensors that detect the rotation state of the mobile device, such as a gyro sensor and/or an acceleration sensor. In the present embodiment, it is assumed that the rotation detector 120 includes a gyro sensor and an acceleration sensor.

The video processor 100 processes images acquired via the camera module 110, such as preview images, still images, and moving images. The video processor 100 analyzes the output of the rotation detector 120 and detects the rotation state of the mobile device in moving image capturing mode. The video processor 100 rotates and stores the captured images according to the detected, rotation state of the mobile device. That is, the video processor 100 performs control operations to store the captured images in a normal phase, irrespective of the rotation state of the mobile device.

The video processor 100 includes an image processor (not shown) for processing images acquired via the camera module 110, a still image codec (not shown), a moving image codec (not shown), and a frame buffer (not shown) for adjusting images to a normal phase according to the rotation state of the mobile device. The frame buffer may be located at any position in the video processor 100.

The video processor 100 controls the operations of the camera system according to the control instructions input to the input unit 150. If the video processor 100 receives an instruction for operating the camera module 110 via the input unit 150, it controls the camera module 110 and operates the system in preview mode. If the video processor 100 receives an instruction for capturing images via the input unit 150, it detects the rotation state of the mobile device via the rotation detector 120. The video processor 100 processes the images captured via the camera module 110 to a normal phase by rotating the images according to the detected, rotation state of the mobile device.

The video processor 100 may be implemented in such a manner that the frame buffer is included in the image processor or located at the front stage of the moving image codec. If the frame buffer of the video processor 100 is included in the image processor, the video processor 100 controls the image processor to process the images by rotating them according to the rotation state of the mobile device, the moving image codec to compress and encode the processed images, and the storage unit 130 to store the processed images. If the frame buffer of the video processor 100 is located at the front stage of the moving image codec, the video processor 100 controls the image processor to process the images, stores the images in the frame buffer, rotates the images stored in the frame buffer according to the rotation state of the mobile device, applies them to the moving image codec, and stores the images, compressed and encoded via the moving image codec, in the storage unit 130.

The storage unit 130 may be implemented with memory devices that store images captured via the camera system. The storage unit 130 can also store still images.

The display unit 140 may be implemented with a Liquid Crystal Display (LCD), or a Light Emitting Device (LED) display. The display unit 140 displays images captured via the camera system and information related to the image capturing operations. The input unit 150 includes buttons for creating instruction signals for setting or executing the functions of the camera system. The buttons may be implemented in such a manner to include parts that are installed outside the camera system and the other parts that are displayed on a touch panel of the display unit 140. Some of the buttons of the display unit 140 and the input unit 150 are implemented on a touch screen.

Figure 2:
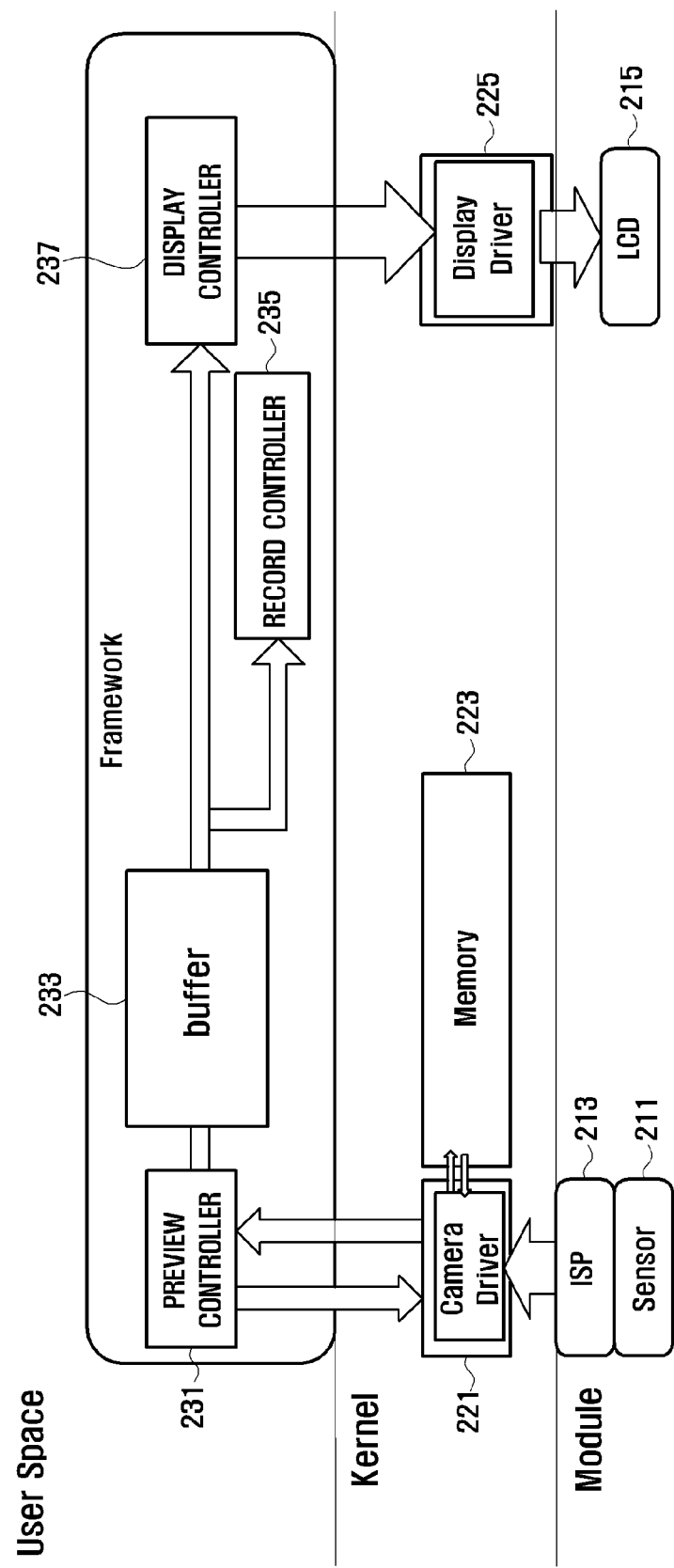
FIG. 2 illustrates a layer structure of a mobile device with a camera or camera system according to an embodiment of the invention.

FIG. 2 illustrates a layer structure of a mobile device with a camera or a camera system according to an embodiment of the invention.

Referring to FIG. 2, a module layer refers to a physical layer and is related to a camera image sensor 211, an image signal processor (ISP) 213, and a display 215. A kernel layer is related to a camera driver 221, a kernel-reserved memory 223 and a display driver 225. A user space layer is related to a preview controller 231, a buffer 233, a record controller 235 and a display controller 237.

When the camera module 110 is operated, the preview controller 231 processes images, received via the camera driver 221 and the camera image sensor 211 and image processor 213, as preview images, and transfers them to the display controller 237 via the buffer 213. The display controller 237 displays the preview images on the display 215 via the display driver 225. When the mobile device is operated in moving image-recording mode, the preview controller 231 performs rotation conversion for the data of the buffer 233. The record controller 235 encodes data of the buffer 233 and stores the data. The data of the buffer 233 refers to converted RAW data, e.g., YUV data or Red/Green/Blue (RGB) data, and is stored in the kernel-reserved memory.

The rotation conversion is performed in the camera driver 221, via a hardware module, under the control of the preview controller 231. However, it should be understood that the data does always have to be stored in the kernel-reserved memory 223. For example, the data may be stored in the user space layer. In addition, the rotation conversion does not always have to be performed in the camera driver 221. For example, the rotation conversion may be executed in the preview controller 231. Alternatively, the rotation conversion may be executed via an additional rotation controller.

FIGS. 3A to 3D illustrate screens describing a method which stores an image in a mobile device with a camera or a camera system, according to the rotation states of the mobile device, according to an embodiment of the invention.

For example, the aspect ratio of the display unit 140 may be 4:3, 16:9, or 16:10. That is, the width is greater that the height. Therefore, the image sensor of the camera module 110 is set, based on the aspect ratio of the display unit 140. As shown in diagrams 311 to 347 of FIGS. 3A to 3D, the image sensor of the camera module 110 may be set to different aspect ratios, thereby acquiring images with corresponding aspect ratios. The images captured via the camera module 110 are stored with the same direction and size, irrespective of the rotation states of the mobile device. The stored images are played back in the same mode in which they are stored. That is, the stored images may be displayed in display modes that differ from the modes when they are captured. Therefore, if the stored images do not include the rotation information when they are recorded, they cannot be rotated to a correct direction when they are displayed.

Figure 3A:
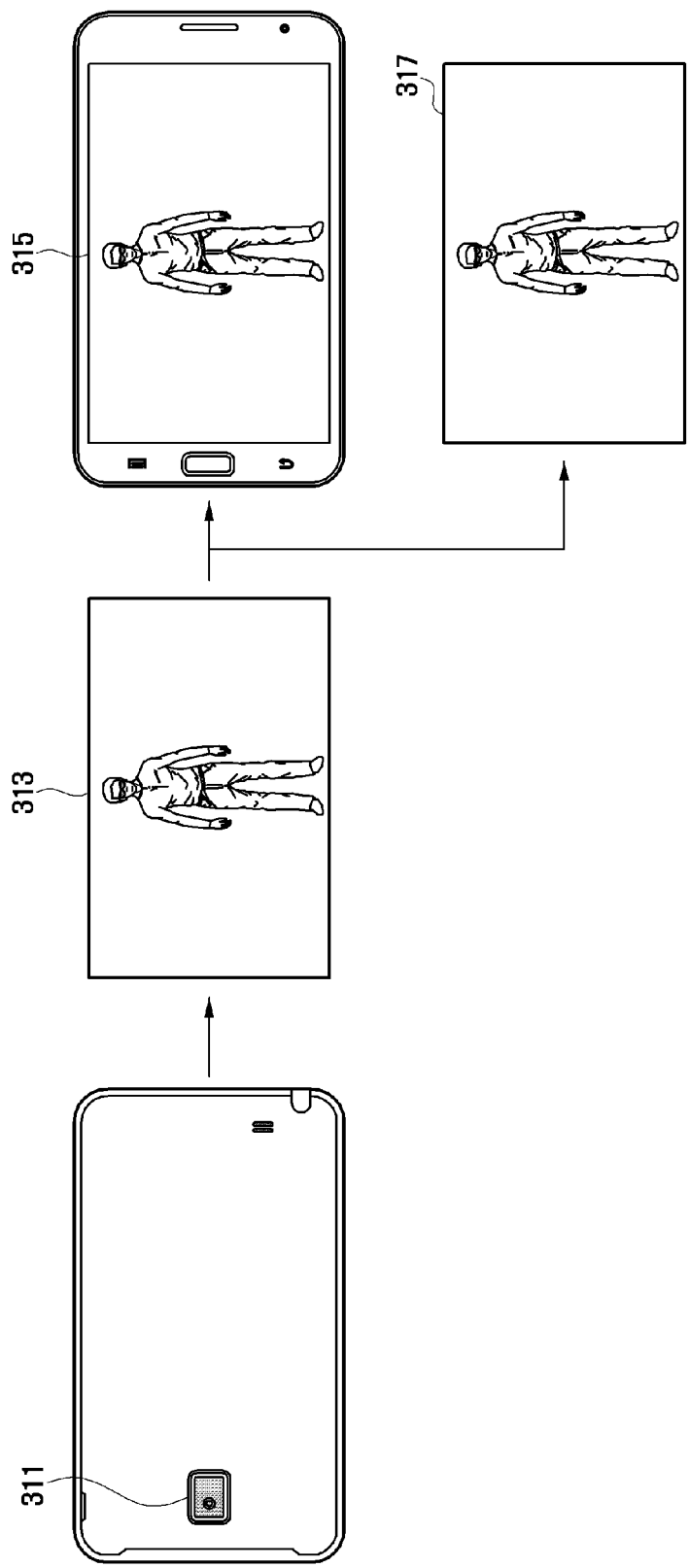

Referring to FIG. 3A, if the camera module 110 captures an image via the image sensor as shown in diagram 311, the captured image is stored in the frame buffer as shown in diagram 313. The video processor 100 detects that the mobile device is not rotated via the rotation detector 120, displays the captured image on the display unit 140 as shown in diagram 315, encodes the image stored in the frame buffer without the rotation, and stores the image as shown in diagram 317. That is, if the camera module 110 captures images when the mobile device is not rotated, the video processor 100 encodes the images without the rotation and stores the images in landscape mode.

Referring to FIG. 3B, if the camera module 110 captures an image via the image sensor rotated by an angle of 90° as shown in diagram 321 as the mobile device is rotated by an angle of 90 with respect to the position shown in as shown in diagram 311, the captured image is stored in the frame buffer as shown in diagram 323. Since the mobile device is rotated by a 90° angle, it displays the captured image in the portrait mode on the display unit 140 as shown in diagram 325. The video processor 100 detects that the mobile device is rotated by a 90° angle via the rotation detector 120, encodes the image stored in the frame buffer by rotating it by a 90° angle, and stores it as shown in diagram 327. That is, if the camera module 110 captures images when the mobile device is rotated by a 90° angle, the video processor 100 rotates the images to a normal phase (a 0° angle), encodes the rotated images, and stores them in portrait mode as shown in diagram 327.

Figure 3C:
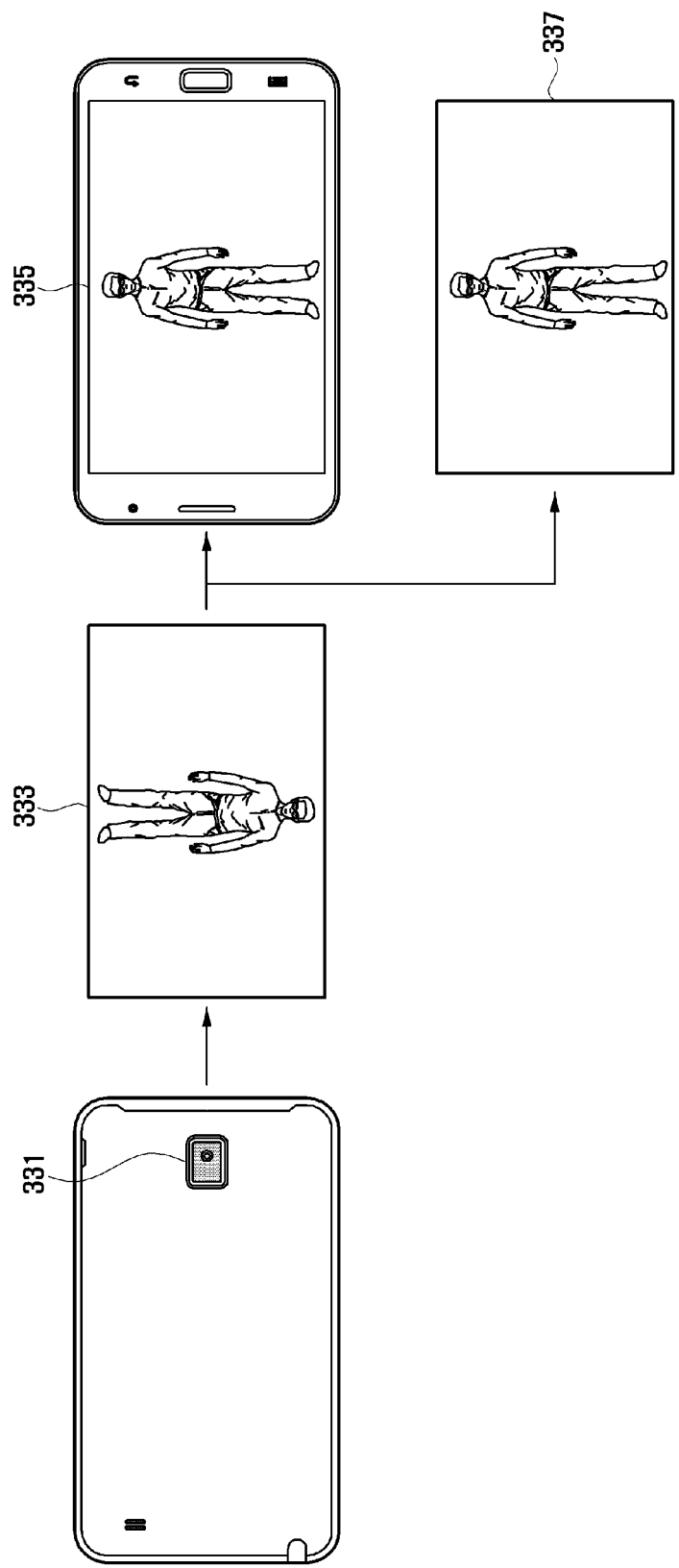

Referring to FIG. 3C, if the camera module 110 captures an image via the image sensor rotated by a 180° angle as shown in diagram 331 as the mobile device is rotated by a 180° angle with respect to the position shown in as shown in diagram 311, the captured image is stored in a reverse phase, in the frame buffer as shown in diagram 333. Since the mobile device is rotated by a 180° angle, it displays the captured image in the landscape mode on the display unit 140 as shown in diagram 335.

Although the image shown in diagram 335 and the image shown in diagram 315 are displayed in the landscape mode on the display unit 140 of the mobile device, the mobile device shown in diagram 335 is rotated by 180° with respect to the position of that shown in diagram 315. The video processor 100 detects that the mobile device is rotated by 180° via the rotation detector 120, encodes the image stored in the frame buffer by rotating it by 180°, and stores the image in landscape mode as shown in diagram 337. That is, if the camera module 110 captures images when the mobile device is rotated by 180°, the video processor 100 rotates them by 180°, encodes the rotated images, and stores them, with the 180° rotation, in landscape mode, as shown in diagram 337.

Referring to FIG. 3D, if the camera module 110 captures an image via the image sensor rotated by 270° as shown in diagram 341 as the mobile device is rotated by 270° with respect to the position shown in as shown in diagram 311, the captured image is stored in the frame buffer as shown in diagram 343. Since the mobile device is rotated by 270°, it displays the captured image in the portrait mode on the display unit 140 as shown in diagram 345.

Although the image shown in diagram 345 and the image shown in diagram 325 are displayed in the portrait mode on the display unit 140 of the mobile device, the mobile device shown in diagram 345 is rotated by 180° with respect to the position of that shown in diagram 325. The video processor 100 detects that the mobile device is rotated by 270° via the rotation detector 120, encodes the image stored in the frame buffer by rotating it by 270°, and stores the image in portrait mode as shown in diagram 347. That is, if the camera module 110 captures images when the mobile device is rotated by 270°, the video processor 100 rotates them by 270° to convert the images to the normal phase (0°), encodes the rotated images, and stores them in portrait mode as shown in diagram 347.

As shown in FIGS. 3A to 3D, the mobile device with a camera or a camera system detects the rotation state via the rotation detector 120 while capturing moving images, acquires moving images via the image sensor of the camera module 110, and stores them in the normal phase, irrespective of the rotation state. The normal phase is where the images are displayed on the display unit 140 according to the user's image-captured purpose during the playback.

The mobile device with a camera or a camera system detects the rotation state while capturing moving images, and rotates and stores the moving images acquired in the detected, rotation state.

Figure 4:
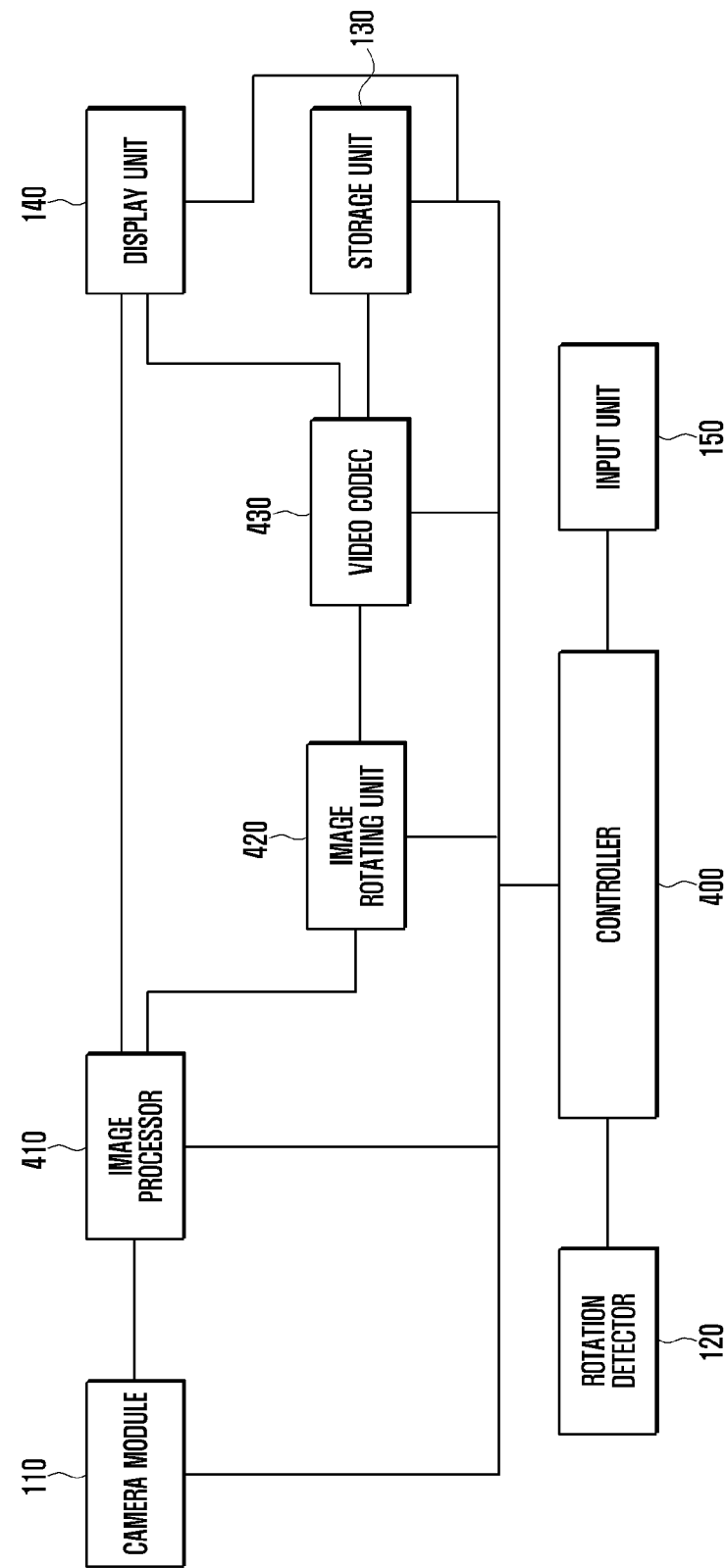
FIG. 4 illustrates a block diagram of a camera system according to an embodiment of the invention.
Figure 5:
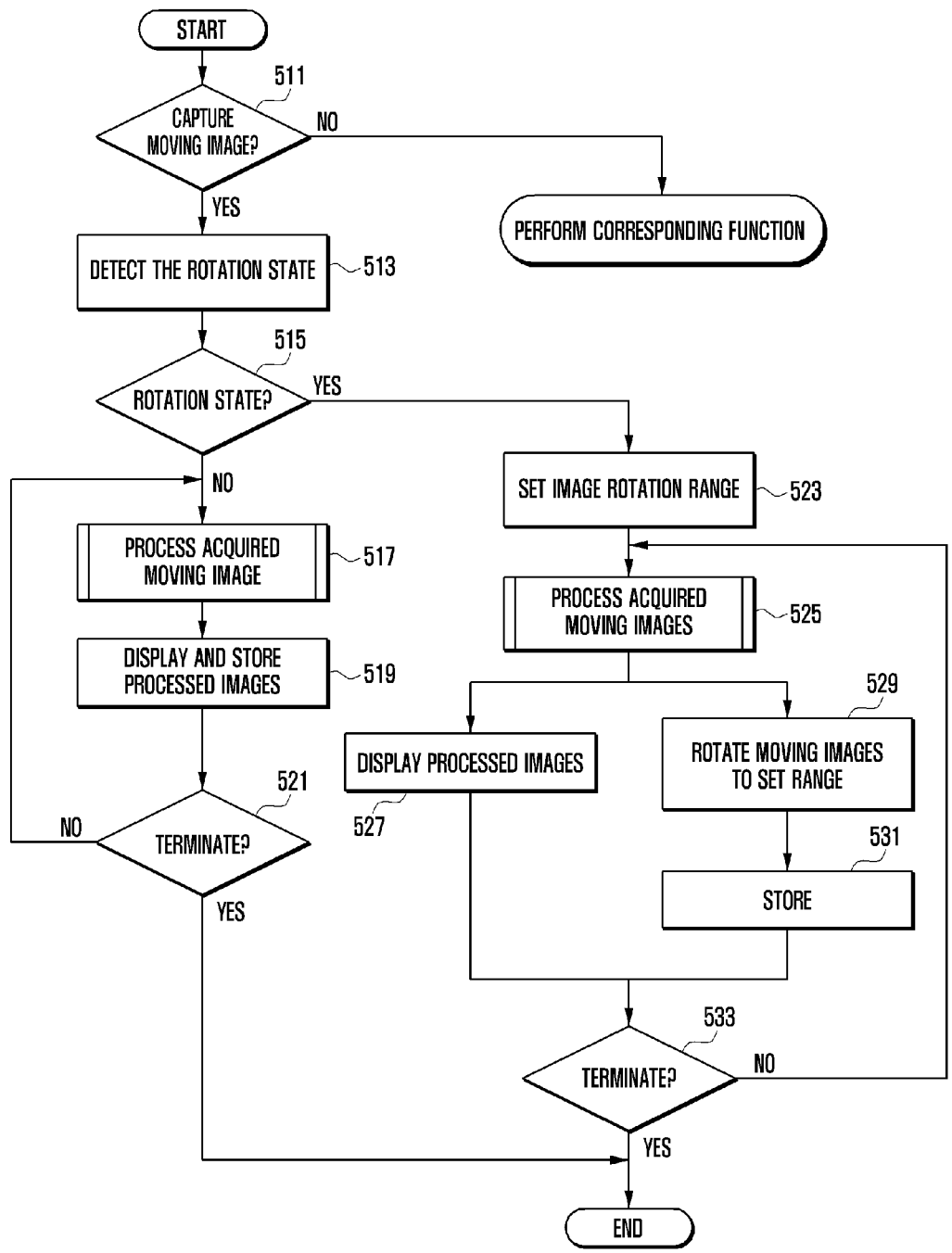
FIG. 5 illustrates a method which stores moving images in a camera system shown in FIG. 4.

FIG. 4 illustrates a block diagram of a first embodiment of a camera system according to the invention. FIG. 5 illustrates a method for storing moving images in a camera system shown in FIG. 4. The camera system includes a camera module 110, a rotation detector 120, a storage unit 130, a display unit 140, an input unit 150, a controller 400, an image processor 410, an image-rotating unit 420, and a video codec 430.

Referring to FIGS. 4 and 5, the camera module 110 acquires images via the image sensor. The rotation detector 120 detects the rotation state of the mobile device, and includes a gyro sensor and an acceleration sensor.

The image processor 410 includes a preprocessor (not shown), a postprocessor (not shown), and an image scaler (not shown). The preprocessor and postprocessor may be incorporated into one processor or separately configured in the image processor 410. The following description will describe the image processor 410 in such a manner that the preprocessor and postprocessor are separately configured in the image processor 410. The image scaler may be located at the front or rear stage of the image processor 410, or between the preprocessor and the postprocessor. The present embodiment is described in such a manner that the image scaler is located between the preprocessor and the postprocessor.

The preprocessor preprocesses images acquired via the camera module 110. Examples of the preprocess are the 3A extraction and process (Auto White Balance (AWB), Auto Exposure (AE), and Auto Focusing (AF)), lens shading correction, dead pixel correction, and knee correction. The image scaler adjusts the size of full resolution images of the camera module 110, output from the preprocessor, to an image size to be displayed on the display unit 140 or to be stored. The postprocessor processes the image-scaled Bayer data via color interpolation, noise removal, and color correction, applies image conversion to the processed data, and thus creates YUV data. The images output from the postprocessor are YUV data scaled to the screen size of the display unit 140.

The displayed images are stored as moving images. If a request is made to capture moving images, the video codec 430 encodes the displayed images and stores them in the storage unit 130. The displayed images may have the same size as the images displayed in preview mode. Alternatively, the displayed images may have the number of pixels greater than the preview images. In that case, the image scaler is designed to include one image scaler for preview mode and another image scaler for moving image mode.

Alternatively, the image scaler is set to adjust the scale ratio according to the mode control. If a request is made to store moving images, the controller 400 controls the image scaler of the image processor 410 to scale the displayed images to the image size for displaying moving images. Therefore, the image scaler scales the full resolution image output from the preprocessor to the image size adapted for the display of moving images. Encoding moving images is performed to various formats, such as H.264.

The camera system of FIG. 4 may further include a still image codec for processing still images. The still image codec compresses and encodes images acquired via the camera module 110, where the images have not been scaled. When the image processor 410 preprocesses and postprocesses the full resolution images of the camera module 110, the still image codec compresses and encodes the processed, full resolution images and then stores them.

The camera system of FIG. 4 may further include an audio processing unit (not shown). When recording moving images, the camera system can store audio signals acquired via the audio processing unit, associated with the moving images.

The image-rotating unit 420 buffers images output from the image processor 410 in video record mode, and rotates and outputs the buffered images according to the rotation state under the control of the controller 400. The image-rotating unit 420 may be configured with frame buffers. The video codec 430 compresses and encodes frame images output from the image-rotating unit 420.

The controller 400 controls the operations of the camera system according to the control instructions input to the input unit 150. If the controller 400 receives an instruction for operating the camera module 110 via the input unit 150, the controller 400 controls the camera module 110 and the image processor 410 and operates the system in preview mode. If the controller 400 receives an instruction for capturing moving images via the input unit 150, the controller 400 detects the rotation state of the mobile device via the rotation detector 120. The controller 400 controls the image-rotating unit 420, and rotates and outputs the buffered frame images according to the rotation state. The controller 400 controls the video code 430 to compress and encode the rotated frame images and stores them in the storage unit 130.

The storage unit 130 may be implemented with memory devices that store images captured via the camera system. The storage unit 130 may also store still images.

The display unit 140 may be implemented with an LCD or an LED display, for example. The display unit 140 displays images captured via the camera system and information related to the image capturing operations. The input unit 150 includes buttons for creating instruction signals for setting or executing the functions of the camera system. The buttons may be implemented in such a manner that some are installed outside the camera system and others are displayed on a touch panel of the display unit 140. Some of the buttons of the display unit 140 and the input unit 150 are implemented on a touch screen.

In operation of the camera system of FIG. 4, if the controller 400 receives a user's request for executing the camera module 110 via the input unit 150, the controller 400 operates the camera module 110. The images output from the camera module 110 may be full resolution Bayer images. The image processor 410 processes frame images output from the camera module 110 (e.g., preprocessing, postprocessing, and image scaling), and outputs the images as displayed images. The frame rate of the displayed images may be 30 frames per second (fps) or above (e.g., 60 fps). The displayed images output from the image processor 410 are displayed on the display unit 140 as preview images.

If the controller 400 receives a user's request for recording moving images in the condition described above via the input unit 150, it detects the rotation state of the mobile device via the rotation detector 120. If the mobile device is rotated as shown in FIGS. 3A to 3D, the image sensor is also rotated by the rotation angle as shown in diagrams 311 to 347. In that case, the controller 400 detects the rotation angle of the mobile device (i.e., the rotation angle of the image sensor in the camera module 110), and sets an image rotation angle for the stored images corresponding to the detected, rotation angle so that the stored images can be displayed in a normal phase.

The image processor 410 processes images detected via the image sensor of the camera module 110, and displays the images on the display unit 140. Since the image processor 410 processes images output from the camera module 110 and the display unit 140 is also rotated according to the rotation state of the mobile device, the images are displayed on the display unit 140 in the normal phase. That is, if the image sensor of the camera module 110 detects the light of a subject in a vertical position, the detected image is displayed on the display unit 140 in landscape mode, so that the captured image is displayed on the display unit 140 in the normal phase.

If the image sensor is rotated by 180° (i.e., by 180° in landscape mode or by 270° in portrait mode), the images processed via the image processor 410 have reverse phases from the original images, respectively; however, they are displayed on the display unit 140 as portrait images as if they are in the normal phase.

In compression, encoding and storing images, processed via the image processor 410, the images input to the image-rotating unit 420 have different phases according to the rotation states of the mobile device and are processed as landscape mode, irrespective of the portrait mode of the mobile device, as shown in diagrams 313 to 343 shown in FIGS. 3A to 3D. If the images processed via the image processor 410 are compressed, encoded, and stored as they are created, i.e., without the rotation information, they may be displayed on the display unit 140, during the playback, with different phases corresponding to the rotation states of the mobile device when they are captured, respectively. In that case, the phases of the images that are displayed cannot be controlled. Therefore, the user cannot correctly watch the moving images during the playback. The system and method according to the invention can control the image-rotating unit 420 according to the rotation state of the mobile device, record moving images, and store the recorded moving images in the normal phase.

Referring to FIG. 5, the controller 400 determines whether a request is made to capture moving images via the input unit 150 (511). If the controller 400 ascertains that a request has been made to capture moving images at step 511, it detects the rotation state of the image sensor of the camera module 110 (i.e., the rotation state of the mobile device) via the rotation detector 120 (513).

If the controller 400 ascertains that the mobile device has not been rotated at step 515, it processes images acquired via the camera module 110 (517). The controller 400 controls the display unit 140 to display the processed images, the video codec 430 to compress and encode the images without the rotation, and the storage unit 130 to store them (519). The controller 400 determines whether a request is made to terminate capturing moving images (521). If the controller 400 ascertains that a request has not been made to terminate capturing moving images at step 521, the controller 400 returns to and proceeds with step 517. If the controller 400 ascertains that a request has been made to terminate capturing moving images at step 521, the controller 400 terminates the procedure.

If the controller 400 ascertains that the mobile device has been rotated at step 515, it detects the rotation state via the rotation detector 120 and sets an angle to rotate the images via the image-rotating unit 420 (523). The controller 400 controls the image processor 410 to process the images acquired via the camera module 110 (525), and the display unit 140 to display the processed images (527). Since the display unit 140 is rotated by the rotation angle of the mobile device, it can display the captured images in the normal phase. In addition, the controller 400 controls the image-rotating unit 420 to rotate the images, processed via the image processor 410, to the set rotation angle (529).

The controller 400 controls the video code 430 to compress and encodes the rotated moving images and stores them in the storage unit 130 (531). After displaying the processed images at step 527 and storing the images processed via the video codec 430 at step 531, the controller 400 determines whether a request is made to terminate capturing moving images (533). If the controller 400 ascertains that a request has not been made to terminate capturing moving images at step 533, the controller 400 returns to and proceeds with step 525. If the controller 400 ascertains that a request has been made to terminate capturing moving images at step 533, the controller 400 terminates the procedure.

As described above referring to FIG. 5, the controller 400 controls the image processor 410 to process images sensed via the image sensor of the camera module 110, and the display unit 140 to display the processed images. Since the display unit 140 is rotated according to the rotation state of the mobile device, it displays the images, output from the image processor 410, in the normal phase. The image-rotating unit 420 buffers the images output from the image processor 410. The frame images, buffered in the image-rotating unit 420, may be rotated according to the rotation angle of the image sensor of the camera module 110.

The frame images are buffered in the image-rotating unit 420, in the landscape image format corresponding to the rotation state of the image sensor. The landscape image refers to an image with a resolution of width (M)×height (N) where M is greater than N and M and N are integers. Likewise, a portrait image refers to an image with a resolution of width (N)×height (M) where M is greater than N and M and N are integers. For example, M is 640 pixels and N is 480 pixels.

If the mobile device is in the normal phase as shown in FIG. 3A, the controller 400 performs steps 517 to 521 as shown in FIG. 5. During the process, the image processor 410 outputs images in the form as shown in diagram 313 and the display unit 140 displays images as shown in diagram 315. Since the mobile device is not rotated, i.e., in the normal phase (0°), the controller 400 controls the image-rotating unit 420 to output the captured images without the rotation and the storage unit 130 to store the images as shown in diagram 317. That is, the storage unit 130 stores the images, acquired via the camera module 110, as landscape images (M×N), without the rotation.

If the mobile device is rotated from the normal phase by a 90° angle as shown in FIG. 3B, the controller 400 performs steps 523 to 533 as shown in FIG. 5. During the process, the image processor 410 processes images, acquired via the image sensor, as landscape images as shown in diagram 323. However, since the mobile device is in a rotated sate by a 90° angle (i.e., in a portrait state), the mobile device displays the image in the portrait mode as shown in diagram 325.

When playing back the stored images, the controller 400 controls the image-rotating unit 420 to rotate the images by 90°, as shown in diagram 327, such that the images are displayed in the same form as they are captured, the video codec 430 to compress and encode the images rotated by 90°, and the storage unit 130 to store them as portrait images as shown in diagram 327. That is, the storage unit 130 stores the images, acquired via the camera module 110, as portrait images (N×M), with the rotation angle of 90°.

If the mobile device is rotated from the normal phase by 180° and in a landscape position of a reverse phase as shown in FIG. 3C, the controller 400 performs steps 523 to 533 as shown in FIG. 5. During the process, the image processor 410 outputs images in the form as shown in diagram 333 and the display unit 140 displays images as shown in diagram 335. Since the mobile device is rotated by 180° and in a landscape position, the controller 400 controls the image-rotating unit 420 to rotate the captured images by 180° as shown in diagram 337, the video codec 430 to compress and encode the images, and the storage unit 130 to store them as shown in diagram 337. That is, the storage unit 130 stores the images, acquired via the camera module 110, as landscape images (M×N), with the 180° rotation.

If the mobile device is rotated from the normal phase by 270° as shown in FIG. 3D, the controller 400 performs steps 523 to 533 as shown in FIG. 5. The image processor 410 processes images acquired via the image sensor as shown in diagram 343. During the process, the image processor 410 processes images, acquired via the image sensor, as landscape images as shown in diagram 343. However, since the mobile device is in a rotated state by 270° (i.e., in a portrait state as the mobile device is in an upside down direction), it displays the image in the portrait mode as shown in diagram 345. When playing back the stored images, the controller 400 controls the image-rotating unit 420 to rotate them by 270°, as shown in diagram 347, such that the images are displayed in the same form, the video codec 430 to compress and encode the images rotated by 270°, and the storage unit 130 to store them as portrait images as shown in diagram 347. That is, the storage unit 130 stores the images, acquired via the camera module 110, as portrait images (N×M), with the rotation of 270°.

Figure 6:
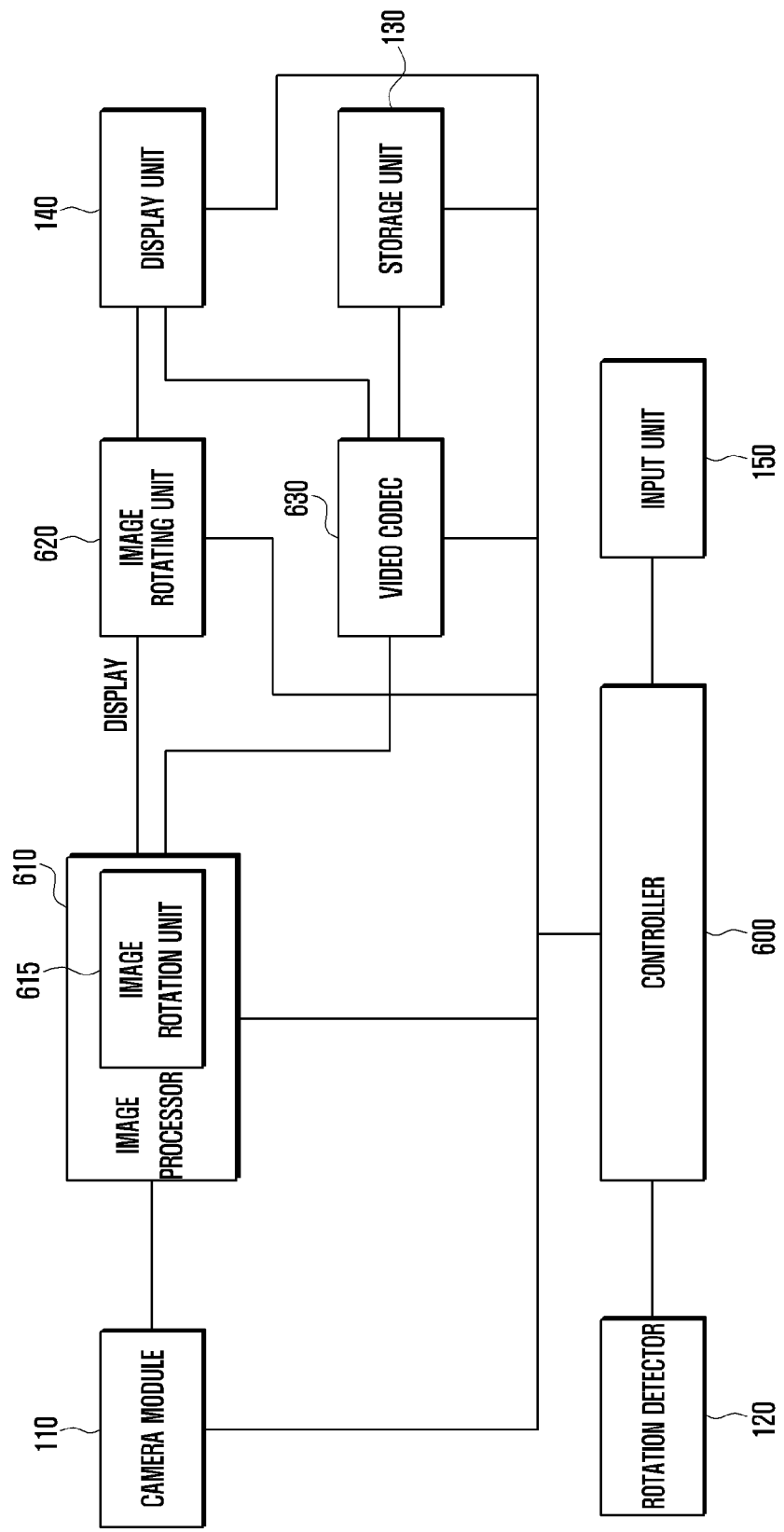
FIG. 6 illustrates a block diagram of a mobile device with a camera or camera system according to an embodiment of the invention.

FIG. 6 illustrates a block diagram of a second embodiment of a mobile device with a camera or camera system according to the invention. The camera system includes a camera module 110, a rotation detector 120, a display unit 140, a storage unit 130, an input unit 150, a controller 600, an image processor 610, an image-rotating unit 620, and a video codec 630. In particular, the image processor 610 includes an image rotation unit 615 for rotating images according to the rotation state of the mobile device.

Referring to FIG. 6, the camera module 110 acquires images via the image sensor. The rotation detector 120 detects the rotation state of the mobile device, and includes a gyro sensor and an acceleration sensor.

The image processor 610 includes a preprocessor, a postprocessor, and an image scaler. The preprocessor and postprocessor may be incorporated into one processor or separately configured in the image processor 610. The following embodiment is described in such a manner that the preprocessor and postprocessor are separately configured in the image processor 610. The image scaler may be located at the front or rear stage of the image processor 610, or between the preprocessor and the postprocessor. In FIG. 6, the image scaler is located between the preprocessor and the postprocessor. The preprocessor, the postprocessor and the image scaler in the image processor 610 operate the same as the image processor 410 shown in FIG. 4.

The image rotation unit 615 of the image processor 610 may be located at the front stage of the preprocessor, the front state of the image scaler, the front or rear stage of the postprocessor. It is preferable that the image processor 610 is located at the rear stage of the image scaler. The image rotation unit 615 buffers images that are being processed in video record mode, and outputs the buffered images by rotating them according to the rotation state of the mobile device under the control of the controller 600. The image rotation unit 615 does not perform an image rotation function in the other modes except for the video record mode. The image rotation unit 615 may be configured as frame buffers.

The image-rotating unit 620 buffers images output from the image processor 610 in video record mode, rotates the buffered images according to the rotation state, and outputs them on the display unit 140, under the control of the controller 600. The image-rotating unit 620 may be configured with frame buffers. The image-rotating unit 620 rotates the images, which have been rotated by the image processor 610 according to the rotation state of the mobile device, to the original images. Since the display unit 140 is rotated according to the rotation of the mobile device, the image-rotating unit 620 re-rotates the rotated images to be in the original state, thereby displaying the images on the display unit 140.

The video codec 630 compresses and encodes frame images output from the image processor 610. The images to be compressed and encoded via the video codec 630 are rotated in the image processor 610 by the rotated angle of the mobile device.

The controller 600 controls the operations of the camera system according to the control instructions input to the input unit 150. If the controller 600 receives an instruction for operating the camera module 110 via the input unit 150, it controls the camera module 110 and the image processor 610 and operates the system in preview mode. During the preview mode, the image rotation unit 615 of the image processor 610 does not execute an image rotation operation, and the image-rotating unit 620 does not operate. If the controller 600 receives an instruction for capturing moving images via the input unit 150 in the preview mode, it detects the rotation state of the mobile device via the rotation detector 120. The controller 600 controls the image rotation unit 615 to rotate the frame images that are being processed according to the rotation state. The controller 600 controls the video code 630 to compress and encode the rotated images, and controls the image-rotating unit 620 to re-rotate the rotated images to the original state, and the display unit 140 to display the rotated images.

The storage unit 130 may be implemented with memory devices that store images captured via the camera system. The storage unit 130 may also store still images.

The display unit 140 may be implemented with an LCD or an LED display, for example. The display unit 140 displays images captured via the camera system and information related to the image capturing operations. The input unit 150 includes buttons for creating instruction signals for setting or executing the functions of the camera system. The buttons may be implemented in such a manner that some are installed outside the camera system and others are displayed on a touch panel of the display unit 140. Some of the buttons of the display unit 140 and the input unit 150 are implemented on a touch screen.

In operation of the camera system of FIG. 6, if the controller 600 receives a user's request for executing the camera module 110 via the input unit 150, it operates the camera module 110. The images output from the camera module 110 may be full resolution Bayer images. The image processor 610 processes frame images output from the camera module 110 (e.g., preprocessing, post-processing, and image scaling), and outputs them as displayed images. The frame rate of the displayed images may be 30 frames per second (fps) or above (e.g., 60 fps). The displayed images output from the image processor 610 are displayed, as preview images, on the display unit 140.

If the controller 600 receives a user's request for recording moving images in the condition described above via the input unit 150, it detects the rotation state of the mobile device via the rotation detector 120. If the mobile device is rotated as shown in FIGS. 3A to 3D, the image sensor is also rotated by the rotation angle as shown in diagrams 311 to 341. In that case, the controller 600 detects the rotation angle of the mobile device (i.e., the rotation angle of the image sensor in the camera module 110), and sets an image rotation angle for the stored images corresponding to the detected, rotation angle so that the stored images can be displayed in a normal phase.

The image processor 610 processes images sensed via the image sensor of the camera module 110, and the image rotation unit 615 rotates the images by the rotation angle of the mobile device under the control of the controller 600. Examples of the processed images are images output from the camera module 110, pre-processed images, scaled images or post-processed images.

Since the display unit 140 is rotated according to the rotation state of the mobile device, it can display the captured images in the normal phase. That is, if the image sensor of the camera module 110 senses the light of images in the portrait mode, the display unit 140 is also in the same portrait mode. Therefore, the display unit 140 can display the captured images in the portrait mode.

In addition, if the image sensor senses the light of images in the portrait mode with a reverse phase (i.e., in a state rotated by 180° in landscape mode from the normal phase or by 270° in portrait mode from the normal phase), the display unit 140 is also in the same reverse phase. Therefore, the display unit 140 can display the captured images in the normal phase. Since the image processor 610 includes the image rotation unit 615, the images applied to the display unit 140 are re-rotated to the original rotation angle. To this end, the image-rotating unit 620 re-rotates the images, processed and rotated by the image processor 610, to the original rotation angle and outputs them to the display unit 140. Therefore, the display unit 140 can display the captured images in the normal phase in the rotation state.

The video codec 630 receives the images processed and rotated by the image processor 610, and compresses and encodes them. The images processed via the video codec 630 are stored in the storage unit 130. The storage unit 130 stores moving images in the normal phase, considering the rotation state of the mobile device.

Figure 7:
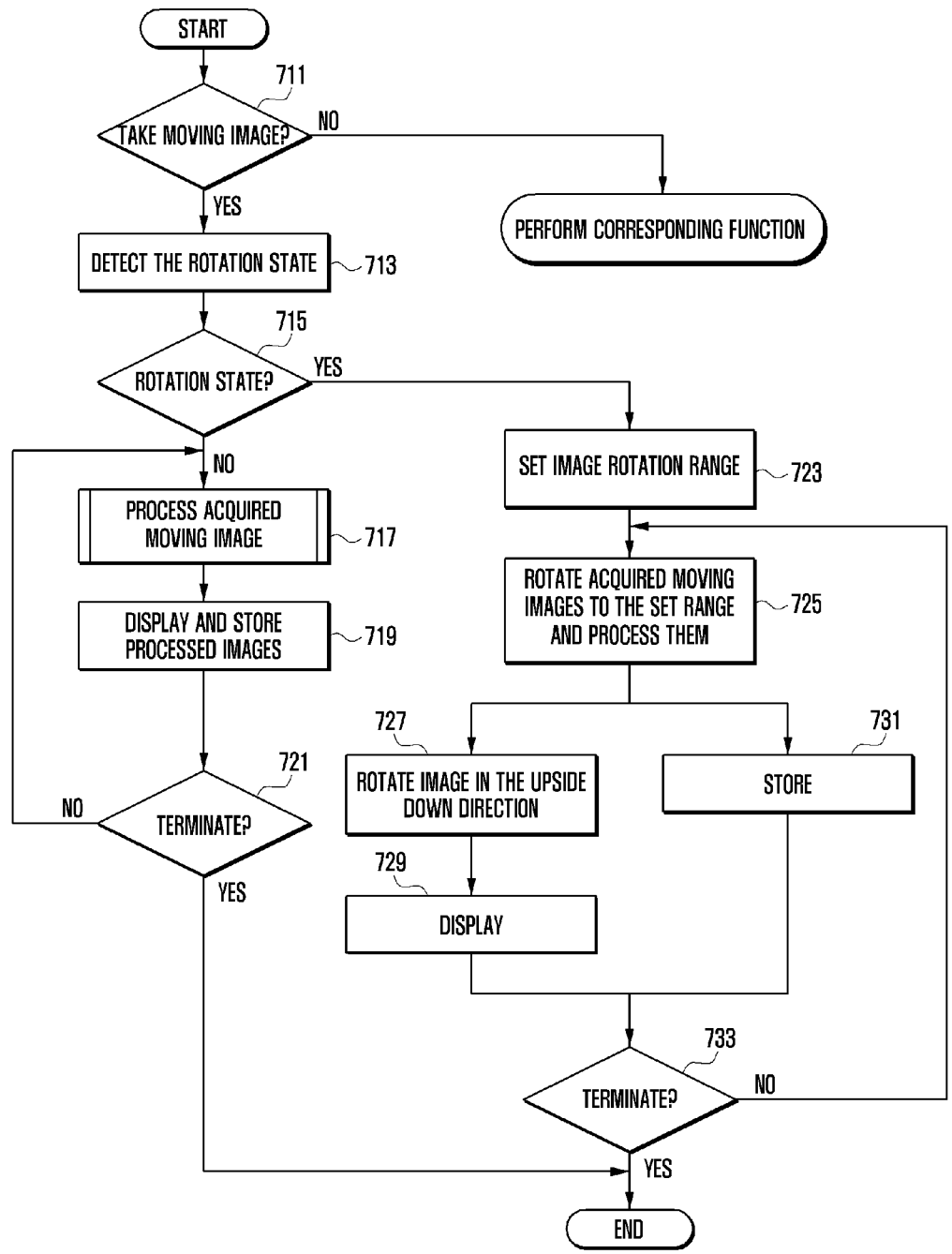
FIG. 7 illustrates a method for recording moving images in a mobile device shown in FIG. 6.

FIG. 7 illustrates a method for recording moving images in a mobile device shown in FIG. 6.

Referring to FIG. 7, the controller 400 determines whether a request is made to capture moving images via the input unit 150 in step 711. If the controller 400 ascertains that a request has been made to capture moving images at step 711, it detects the rotation state of the image sensor of the camera module 110 (i.e., the rotation state of the mobile device) via the rotation detector 120 in step 713.

If the controller 400 ascertains that the mobile device has not been rotated at step 715, it processes images acquired via the camera module 110 in step 717 The controller 400 controls the display unit 140 to display the processed images, the video codec 430 to compress and encode the images, and the storage unit 130 to store them without the rotation in step 719. During the process, the image rotation unit 615 in the image processor 610, and the image-rotating unit 620, located at the front stage of the display unit 140, do not operate. The controller 400 determines whether a request is made to terminate capturing moving images in step 721. If the controller 400 ascertains that a request has not been made to terminate capturing moving images at step 721, it returns to and proceeds with step 717. If the controller 400 ascertains that a request has been made to terminate capturing moving images at step 721, it terminates the procedure.

If the controller 600 ascertains that the mobile device has been rotated at step 715, it detects the rotation state via the rotation detector 120 and sets an angle to rotate the images via the image-rotating unit 620 in step 723. The controller 600 controls the image processor 610 to process the images acquired via the camera module 110, and the image rotation unit 615 to rotate the images by the rotation angle of the mobile device in step 725. The controller 600 re-rotates the images that have been rotated by the image processor 610 to the original rotation angle in step 727, and displays the re-rotated images on the display unit 140 in step 729.

Since the display unit 140 is rotated by the rotation angle of the mobile device, the controller 600 re-rotates the rotated images to the original state and displays them on the display unit 140 in the normal phase. In addition, the controller 600 controls the video code 630 to compress and encode the rotated images, output from the image processor 610, and stores them in the storage unit 130 in step 731. After displaying the processed images at step 729 and storing the images processed via the video codec 630 at step 731, the controller 600 determines whether a request is made to terminate capturing moving images in step 733. If the controller 600 ascertains that a request has not been made to terminate capturing moving images at step 733, it returns to and proceeds with step 725. If the controller 600 ascertains that a request has been made to terminate capturing moving images at step 733, it terminates the procedure.

As described above referring to FIG. 7, the controller 600 controls the image processor 610 to process images sensed via the image sensor of the camera module 110, with the rotation of the images by the rotation angle of the mobile device, and the display unit 140 to display the processed images. The controller 600 controls the video codec 630 to compress and encodes the images, rotated in the image processor 610, and stores them in the storage unit 130.

If moving images are captured as the mobile device is rotated in landscape mode, the controller 600 stores them in the landscape mode in the storage unit 130. If moving images are captured as the mobile device is rotated in portrait mode, the controller 600 stores them in the portrait mode in the storage unit 130. If moving images are captured as the mobile device is rotated to a reverse phase from the normal phase, the controller 600 rotates them to the normal phase and stores them in the storage unit 130. Therefore, the system and method according to the invention can store moving images in the storage unit 130 in the normal phase, irrespective of the rotation state of the mobile device, and plays back the moving images in the normal phase.

Since the display unit 140 is rotated according to the rotation state of the mobile device, if the image processor 610 rotates captured images, the display unit 140 displays the images in a reverse phase from the normal phase. The controller 600 controls the image-rotating unit 620 to re-rotate the images that have been rotated in the image processor 610 to the original state of the images that the camera module 110 captured, and then displays the re-rotated images in the normal phase on the display unit 140. Therefore, the system and method according to the present invention can store moving images in the storage unit 130 in the normal phase, irrespective of the rotation states of the mobile device as shown in FIGS. 3A to 3D.

As described above, if mobile device with the camera system or camera described above receives a user's instruction for capturing moving images, it detects the rotation state via the rotation detector 120. If the mobile device ascertains that the images are captured in landscape mode based on the detected, rotation state, it sets the rotation angle for the captured images by altering the width and height resolutions of the images. If the mobile device ascertains that it captures images in a reverse phase (in an upside down direction) based on the detected, rotation state, it sets the rotation angle for the captured images to rotate them to the reverse phase. This allows the mobile device to record video frames in the normal phase, irrespective of the rotation state of the mobile device.

If the display unit 140 displays images in a mode that differs from a mode in which the images are acquired by the image sensor as the mobile device is rotated (for example, if the mobile device in a portrait mode captures images, the captured images are displayed in portrait mode on the display unit, however, the image sensor processes the captured images as landscape images; or if the mobile device in a reverse phase (in an upside down direction) captures images, the captured images are displayed in the normal phase on the display unit, however, the image sensor processes the captured images as reverse phase images), the captured images may be displayed in an incorrect direction, e.g., rotated images, on the display unit during the playback. To cure these problems, the system and method according to the present invention detects the rotated angle of the mobile device, rotates the captured images by the rotated angle, and stores the captured images.

The system and method according to the present invention captures and stores images by setting the altered resolution and the video frame rotation. Therefore, the captured moving images to be stored in the storage unit 130 are rotated to the normal phase according to the rotation state of the mobile device.

Although it was not illustrated in FIGS. 4 and 6, the video processor may include a menu for setting a video record mode according to a user's settings. For example, the menu may include menu items for selecting a video recode mode in which the phase of images displayed on the display unit 140 is matched with that of images acquired via the image sensor and the processed images are store, and a conventional video record mode in which images acquired via the image sensor of the camera module 110 are recorded as they are captured, irrespective of images displayed in a video record mode. When a corresponding menu item is selected in the setting menu in video record mode, the mobile device operates in corresponding video record mode.

If there are altered settings during the video record operation or after terminating the video record operation, the video processor restores the altered settings to the default or previous settings before performing the record operation.

As described above referring to FIGS. 5 and 7, the system and method according to the present invention allows the mobile device with a camera system and camera to store moving images in the storage unit 130 in the normal phase, irrespective of the rotation states, during the video record mode. That is, the mobile device stores images captured in landscape mode in the landscape image format and images captured in portrait mode in the portrait image format. Since moving images stored in the storage unit 130 are stored in the normal phase irrespective of the rotation state of the mobile device, the images can always be displayed in the normal phase on the display devices irrespective of the types of playback devices.

If the playback device is a mobile device, it can execute a playback function in a reverse phase state (in landscape mode where it is rotated from the normal phase by 180° and in portrait mode where it is rotated from the normal phase by 270°). In that case, the moving images are played back in a reverse phase on the display unit 140. The video processor detects the rotation state of the mobile device via the rotation detector 120, and rotates and plays back the images, stored in the storage unit 130, by the detected, rotated angle. That is, if the playback device is positioned in portrait mode and landscape mode in the normal phase, the video processor processes and plays back the moving images stored in the storage unit 130 as they are stored.

If the playback device is positioned in portrait mode and landscape mode in a reverse phase with respect to the normal phase, the video processor rotates the moving images stored in the storage unit 130 by 180° and plays back the moving images. Therefore, when the mobile device operates in video record mode, it can store the captured images in the normal phase irrespective of the rotation state and always display the captured images in the normal phase on the display devices irrespective of the types of playback devices.

As described above, the system and method according to the present invention can store moving images captured by a mobile device according to the mobile device user's purpose irrespective of an angle at which the user holds the mobile device, and can play back and display the recorded moving images according to the mobile device user's purpose at the time of recording, without the metadata. Although the mobile device with a camera or camera system captures moving images upside down, the system and method according to the invention can rotate and record the captured images in a correct direction in which they are played back and displayed.

Although embodiments of the invention have been described in detail hereinabove, it should be understood that many variations and modifications of the basic inventive concept herein described, which may be apparent to those skilled in the art, will still fall within the spirit and scope of the embodiments of the invention as defined in the appended claims.

What is claimed is:

1. A method for recording moving images via a camera, comprising:
    displaying images acquired via a camera module in a preview mode;
    detecting a rotation state of a device in an image record mode;
    setting an image rotation angle based on the detected rotation state;
    rotating the images by the set image rotation angle and displaying the rotated images; and
    encoding and storing the rotated images as moving images,
    wherein the rotating the images comprises altering a resolution of the image based on the set image rotation angle, and
    wherein the rotated images are encoded with the altered resolution, and
    wherein setting the image rotation angle comprises:
        setting the image rotation angle by comparing the rotation state of an image sensor of the camera module with the detected rotation state of the device;

setting, if the image sensor outputs in a landscape mode and the device is positioned in a portrait mode, the image rotation angle so that a landscape image, acquired via the image sensor, is rotated to a portrait image;

setting, if the image sensor outputs in the portrait mode and the device is positioned in the landscape mode, the image rotation angle so that the portrait image, acquired via the image sensor, is rotated to the landscape image; and setting, if the device is positioned in a reverse phase, the image rotation angle so that images acquired via the image sensor are rotated in the reverse phase.

2. The method of claim 1, wherein setting the image rotation angle by comparing comprises:

inputting an output of a sensor for setting the rotation state of the device.

3. The method of claim 1, wherein displaying images acquired via the camera module comprises:

processing images acquired via the camera module and creating the displayed images; and displaying the displayed images, wherein the rotation of images comprises rotating the created, displayed images.

4. The method of claim 1, wherein displaying images acquired via the camera module comprises:

processing images acquired via the camera module and creating the displayed images; and displaying the displayed images, wherein the rotation of images comprises rotating the created, displayed images, and wherein the display of the displayed images comprises re-rotating the rotated displayed images at an original rotation angle.

5. The method of claim 1, wherein the rotation of images comprises:

rotating, if the image rotation angle is a 90° angle, the landscape image, acquired via the image sensor, by 90° to convert the landscape image to the portrait image.

6. The method of claim 1, wherein the rotation of images comprises:

rotating, if the image rotation angle is 180°, the landscape image, acquired via the image sensor, by 180° to convert the landscape image by reversing a phase of the landscape image with respect to a normal phase.

7. The method of claim 1, wherein the rotation of images comprises:

rotating, if the image rotation angle is 270°, the landscape image, acquired via the image sensor, by 270° to convert the landscape image to the portrait image with the reverse phase with respect to the normal phase.

8. A device for recording moving images comprising:

a camera module with an image sensor;

a rotation detector configured to detect a rotation state of the device in an image record mode;

a buffer configured to buffer images acquired via the camera module;

a video processor configured to display images acquired via the camera module, set an image rotation angle based on the detected rotation state, rotate the images with the set image rotation angle, display the rotated images, encode the rotated images as moving images, and alter a resolution of the image based on the set image rotation angle;

a storage unit configured to store the encoded moving images; and a display unit configured to display the images output from the video processor, wherein the rotated images are encoded with the altered resolution, and wherein the video processor is further configured to set the image rotation angle by comparing the rotation state of the image sensor of the camera module with the detected rotation state of the device, set, if the image sensor outputs in a landscape mode and the device is positioned in a portrait mode, the rotation angle so that a landscape image, acquired via the image sensor, is rotated to a portrait image, set, if the image sensor outputs in the portrait mode and the device is positioned in the landscape mode, the rotation angle so that the portrait image, acquired via the image sensor, is rotated to the landscape image, and set, if the device is positioned in a reverse phase, the rotation angle so that images acquired via the image sensor are rotated in the reverse phase.

9. The device of claim 8, wherein the video processor comprises:

an image processor configured to process images acquired via the camera module;

an image-rotating unit configured to rotate the processed images by the set rotation angle;

a video codec configured to encode the rotated images and output the encoded, rotated images to the storage unit; and a controller configured to set the image rotation angle in image record mode, and control the image-rotating unit to rotate the images output from the image processor.

10. The device of claim 9, wherein the rotation detector comprises:

at least one of a gyro sensor and an acceleration sensor.

11. The device of claim 8, wherein the video processor comprises:

an image processor configured to process images, acquired via the camera module, and rotate the processed images by the set rotation angle, wherein the image processor includes an image-rotating unit;

a video codec configured to encode the images, rotated via the image processor, and output the encoded, rotated images to the storage unit;

an image-rotating unit configured to re-rotate the processed images by the set rotation angle in the opposite direction and display the re-rotated images on the display unit; and a controller configured to detect a rotation state of the device to set the image rotation angle in image record mode, and control the image-rotating unit to rotate the images.

12. The method of claim 1, wherein the rotation state is detected by a rotation detector that comprises at least one of a gyro sensor and an acceleration sensor.

* * * * *